May 9, 1944.    C. A. SAWTELLE    2,348,499
BRAKE SHOE
Filed Dec. 5, 1942
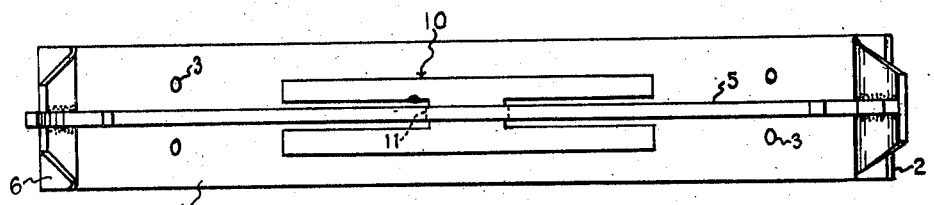
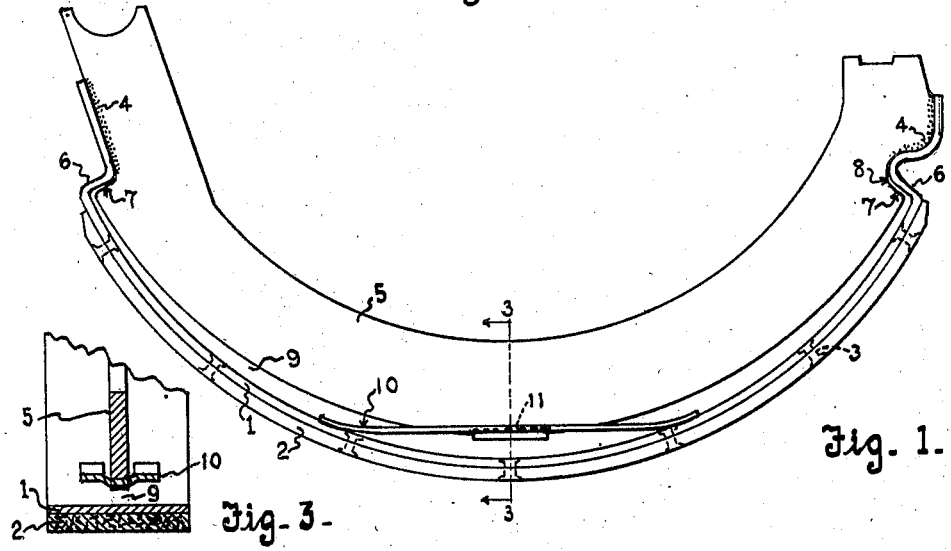
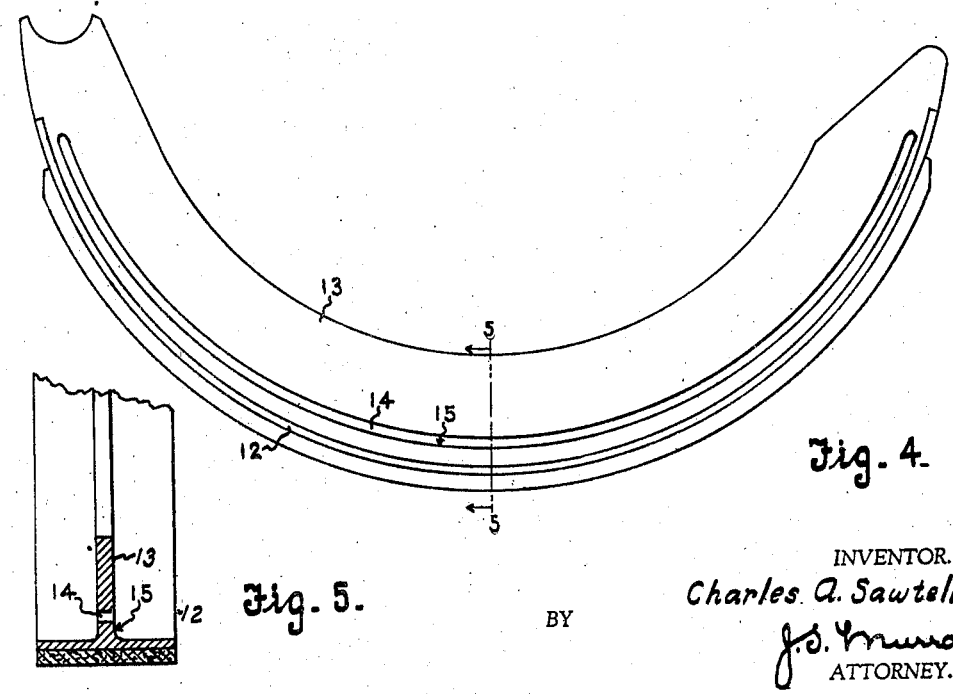
INVENTOR.
Charles A. Sawtelle
BY
ATTORNEY.

Patented May 9, 1944

2,348,499

UNITED STATES PATENT OFFICE 2,348,499

BRAKE SHOE

Charles A. Sawtelle, Plymouth, Mich.

Application December 5, 1942, Serial No. 467,940

10 Claims. (Cl. 188—250)

This invention relates to brake shoes and particularly vehicle brake shoes, the present application being a continuation in part of my pending application, Serial Number 409,601, filed September 5, 1941, from which Patent 2,312,363 issued March 2, 1943.

An object of the invention is to provide a brake shoe having a portion seating a lining and affording this entire portion a flexibility similar to that of a band thus rendering the lining fully effective despite deformation or localized wear of the corresponding drum.

Another object is to provide a brake shoe comprising a radially flexible band member carrying a friction lining, and to resiliently reinforce the band member remotely from its anchored ends.

A further object is to afford said band member a slight circumferential play relative to the remainder of the shoe.

A further object is to provide a brake shoe comprising a substantially arcuate web member and an arcuate band member carried by the web member, the band member having its end portions rigidly connected to those of the web member and being free to flex radially between said end portions, and the web member having a sufficient radial flexibility to permit a slight increase of the divergency of the end portions of the web member to occur after the mid portion of the band member has taken effect on a drum, such increase assuring that the end portions of the band will likewise take effect.

These and various other objects are attained by the construction hereinafter described and illustrated by the accompanying drawing, wherein:

Fig. 1 is a side view of one form of shoe embodying the invention.

Fig. 2 is an interior view of said shoe.

Fig. 3 is a radial sectional view of the shoe taken on the line 3—3 of Fig. 1.

Fig. 4 is a side view of another form of the improved shoe.

Fig. 5 is a radial section taken on the line 5—5 of Fig. 4.

Referring now in greater detail to the construction shown in Figs. 1-3, the reference character 1 designates an arcuate band member having the usual lining 2 secured on its outer face by rivets 3 or the like. End portions of the band are welded, as indicated at 4, to end portions of a substantially semi-circular web member 5, having a slight radial flexibility and being disposed in a radial plane substantially medial to the band member. Between its welded end portions and the lining extremities, the band member is radially offset inwardly as indicated at 6 and between the offsets 6 the web member is formed with radial shoulders 7 normally spaced slightly from the offsets. As illustrated, the shoulder 7 of the upper end portion of the web member results from reducing the radial dimension of said entire end portion, and the lower shoulder 7 is formed as one edge of a notch 8 extended from the outer edge of the web member, the band member having a portion of approximate U-shape entered in such notch. However, the shoulder construction shown at either end of the shoe could be used at both ends. A radial clearance 9 is provided between the band and web members, and preferably this clearance gradually increases from the shoulders 7 to a point midway between the latter. This is for the purpose of accommodating in the relatively wide mid portion of the clearance slot a spring 10 resisting inward deformation of the band member. Said spring as illustrated is a sheet metal stamping of an approximate H shape, the cross piece of said stamping being seated in a notch 11 formed in the outer edge of the web member and the spring extremities being stressed against the band member, this arrangement maintaining the spring in place without requiring fastening means or retainers.

The described construction secures in a brake shoe the major advantages of a brake band. Since the band member 1 is rigidly held only at its ends, it may resiliently undergo a material deformation in use, permitting it to fully conform to a brake drum despite variations of the drum shape due to wear, heat, or other causes. This is of course not true of ordinary fully rigid brake shoes which can be conformed to only one definite drum shape, any deformation of the drum resulting in only a partial engagement thereof by the shoe until sufficient wear has occupied to produce conformity.

By providing offsets 6 in the band member and opposing shoulders in the web member, the welded connections between the end portions of said members are to a material extent relieved of torque stresses, and the provision of a slight normal clearance between said offsets and shoulders serves to increase slightly the range of flexibility of the band member.

Since the mid portion of a shoe is subject in use to radial pressures exceeding those imposed on the end portions it is desirable to provide some support of a yielding nature for the mid portion of the band to avoid excessive yielding of this portion. The spring 10 serves as such a support.

Figs. 4 and 5 illustrate a modification in which a band member 12 and a web member 13 are integrally connected at their end portions, the web member being formed between said end portions with an arcuate slot 14 spaced slightly inward from the band member so as to leave a reinforcing rib 15 on the band member. It is preferred to render said slot so eccentric to the band member that the radial dimension of the rib 15 gradually increases from its ends to its mid portion. Thus the radial flexibility of the band is progressively reduced from the end portions to the mid portion of the shoe in compensation for the relatively heavy pressures imposed upon the mid portion.

In either disclosed form of the invention it is a vital feature that the entire length of the lining is between the anchored ends of the band member. Thus the lining as a whole may conform itself to the drum, as is necessary to compensate for expansion, contraction or other deformations effecting the entire drum.

In either disclosed form of the invention, an important advantage is derived from affording the web member a slight predetermined radial flexibility. This advantage lies in the fact that the end portions of the shoe may through flexure fulcrum about its mid portion when the latter has been applied to a drum, whereby it is assured that said end portions will be substantially as effective as the mid portion. The provision of a slight clearance between the shoulders 7 of the web member and the inturned portions 6 of the band member assures against any material resistance being offered by the band member to the slight increase in the divergent relation of the web member end portions as they fulcrum as above described.

What I claim is:

1. A brake shoe comprising a substantially arcuate, radially flexible band member, a web member carrying the band member and having its end portions rigidly connected to those of the band member, and having a radial clearance from the band member throughout the extent of said members between said end portions, and a friction lining applied to the outer face of the band member and disposed in its entirety between said end portions, said web member being substantially arcuate and having a predetermined radial flexibility materially less than that of the band member.

2. A brake shoe as set forth in claim 1, said web member being substantially arcuate and having a radial flexibility materially less than that of the band member, and being formed with substantially radial shoulders between its said end portions and the lining, and the band member having portions inturned to confront said shoulders, such inturned portions normally having a slight clearance from said shoulders.

3. A brake shoe as set forth in claim 1, the end portions of the web member having substantially radial shoulders and the band member having portions beyond the ends of the lining inturned in close proximity to such shoulders.

4. A brake shoe as set forth in claim 1, the band member having substantially radial portions between the lining extremities and said rigid connections for transmitting torque stresses, and the web member being formed with shoulders between and in close proximity to said radial portions for receiving such stresses.

5. A brake shoe as set forth in claim 1, the portion of the band member engaged by the lining having a limited circumferential play relative to the web member.

6. In a brake shoe as set forth in claim 1, a spring reacting between the mid portions of the band and web members and resisting reduction of said radial clearance.

7. In a brake shoe as set forth in claim 1, a sheet metal spring engaged between the band member and outer edge of the web member, substantially midway between the ends of the shoe and resisting reduction of said radial clearance.

8. In a brake shoe as set forth in claim 1, a spring of an approximate H-shape interposed between the mid portions of the band and web members and resisting reduction of said radial clearance, the mid portion of said spring engaging the web member and its end portions engaging the band member.

9. A brake shoe comprising a substantially arcuate, radially flexible band member, a substantially arcuate web member carrying the band member and having its end portions rigidly connected to those of the band member, said web member being formed with a slot extending from one to the other of said end portions and progressively converging toward the band from the mid portion to the ends of the slot, whereby the band is formed with a reinforcing rib, progressively varying as to its radial dimension and having said dimension a maximum at the mid portion of such rib.

10. In a brake shoe as set forth in claim 1, means materially reducing the radial flexibility of the mid portion of said band member below that of its end portions.

CHARLES A. SAWTELLE.